C. A. BROWN.
DEVICE FOR FORMING SQUARE HOLES.
APPLICATION FILED SEPT. 28, 1909.
956,474. Patented Apr. 26, 1910.
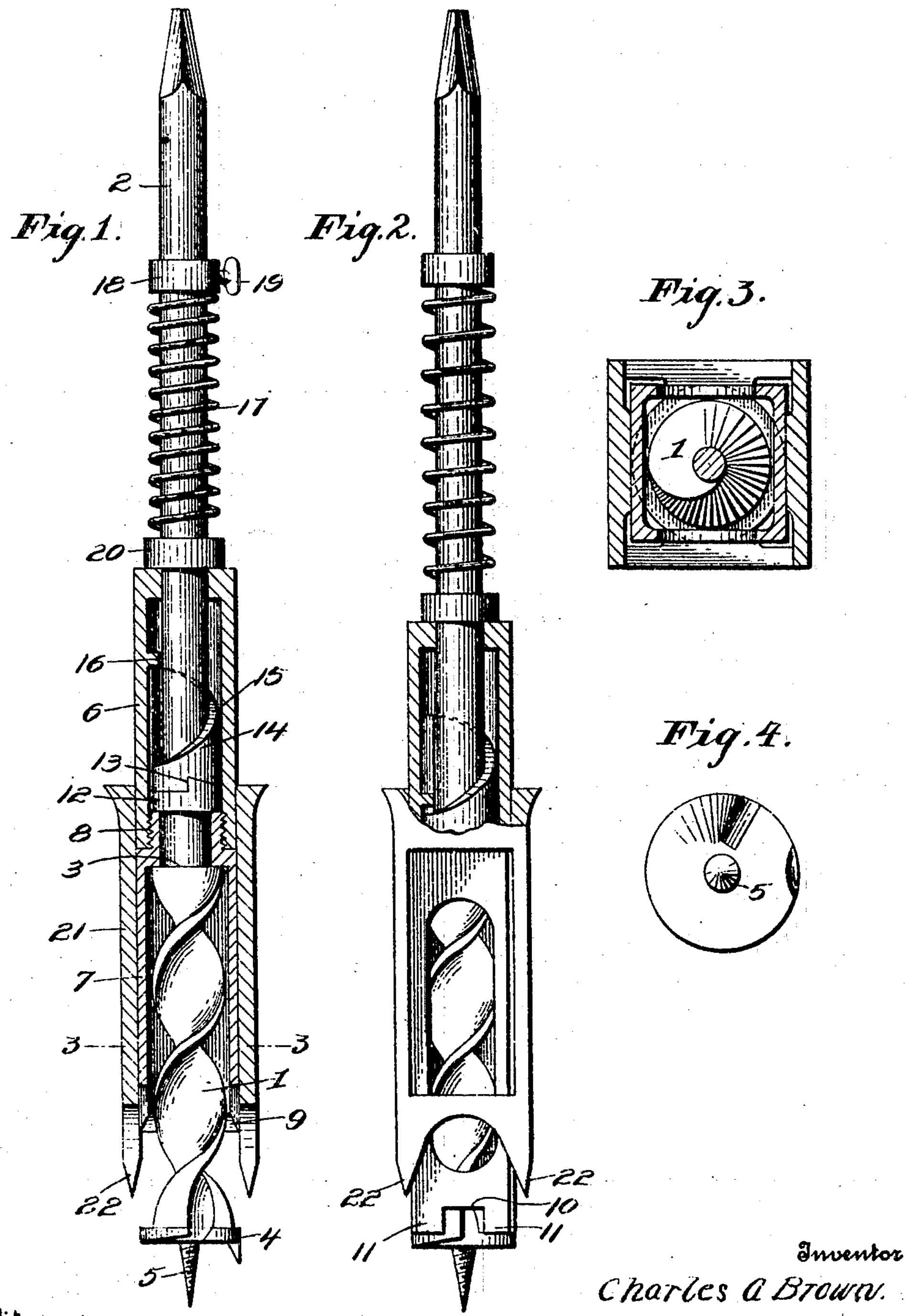
Witnesses
Wm Smith
R. M. Smith
Inventor
Charles A Brown.
By Victor J. Evans
Attorney.

UNITED STATES PATENT OFFICE.

CHARLES A. BROWN, OF CONWAY, MISSOURI.

DEVICE FOR FORMING SQUARE HOLES.

956,474. Specification of Letters Patent. Patented Apr. 26, 1910.

Application filed September 28, 1909. Serial No. 519,959.

*To all whom it may concern:*

Be it known that I, CHARLES A. BROWN, a citizen of the United States, residing at Conway, in the county of Laclede and State of Missouri, have invented new and useful Improvements in Devices for Forming Square Holes, of which the following is a specification.

This invention relates to devices for forming square holes, the object of the invention being to provide a combined auger and chisel in which the chisel is automatically reciprocated simultaneously with the rotation of the boring bit whereby in forming the round or cylindrical hole, the chisel operates to chip out and remove portions of the wood around the hole so that the resultant bore or hole is squared in cross section.

A further object of the invention is to provide a construction which will admit of the several parts of the device being readily separated and taken apart for sharpening and other repairs when necessary.

With the above and other objects in view the invention consists in the novel construction, combination and arrangement of parts herein fully described, illustrated and claimed.

In the accompanying drawings:—Figure 1 is a longitudinal section partly in elevation of the device of this invention. Fig. 2 is a side elevation partly in section taken at right angles to Fig. 1. Fig. 3 is a cross section on the line 3—3 of Fig. 1. Fig. 4 is a face view of the boring bit.

Referring to the drawings 1 designates a boring bit and 2 the shank thereof, a shoulder 3 being formed at the junction of the boring portion of the bit and the shank 2. The boring bit is provided with the usual cutting portion 4 and centering point 5.

The boring bit and a portion of the shank thereof are embraced and inclosed by a casing comprising an upper section 6 and a lower section 7, said sections being joined together by a threaded joint as shown at 8 whereby they may be readily separated. The lower section 7 constitutes a reciprocatory chisel which is square in cross section and the width of which is equal to the diameter of the head or cutting portion 4 of the boring bit as indicated in Figs. 1 and 2. The lower extremity or edge of the chisel is sharpened as shown at 9 and each side thereof is cut away as shown at 10 to allow for the rotation of the cutting head 4, thereby leaving L-shaped corner cutting portions 11 which operate to cut away the wood at the places representing the four corners of a square hole.

In order to provide for automatically reciprocating the chisel 7, a ratchet collar 12 is made fast on the shank 2 so as to rotate therewith, said collar having a single ratchet tooth 13 on its upper edge. Mounted loosely on the shank 2 is a cam sleeve 14 having its upper edge formed on a spiral and adapted to coöperate with a lug or tooth 16 on the inner face of the upper section 6 of the casing as shown in Fig. 1. The sleeve is also provided at its lower edge with a shoulder adapted to engage the shoulder or tooth 13 of the ratchet collar as shown in Fig. 1 when the boring bit is turned to the right or in the boring direction. When the boring bit is reversed as in removing the same from the work, the shoulder of the cam sleeve rides over and snaps the tooth 13 of the ratchet collar and in this backward or reverse movement of the boring bit, the usual reciprocatory movement is not imparted to the chisel.

The chisel is forced downward by means of an expansive coil spring 17 which surrounds the shank 2 and is held between a collar 18 fastened to the shank 2 by means of a set screw 19 and a loose collar 20 which bears against the upper end of the casing 6. The set screw 19 provides for adjusting the collar 18 and thereby the tension or thrust of the spring 17.

In order to prevent the square casing from rotating during the rotation of the boring bit, I provide a square guide 21 through which the chisel is adapted to slide, said guide being provided at its lower end and the four corners thereof with retainer points 22 which may be driven into the wood sufficiently to enable the guide to be conveniently held in one hand of the operator while the other hand is used for turning the boring bit.

It will of course be understood that the boring bit may be operated by means of the usual brace or by a machine.

From the foregoing description it will be understood that as the boring bit is turned, the cam sleeve 14 acts to elevate the chisel and as soon as the edge 14 of the cam sleeve passes by the projection or tooth 16, the spring 17 which has been compressed, expands quickly and thrusts the chisel downward to its work, thereby chipping out such portions of the wood around the hole formed by the boring bit as to produce a square hole.

I claim:—

1. A device for forming square holes comprising a rotary boring bit, a hollow square chisel embracing the boring bit and mounted to slide up and down thereon comprising upper and lower sections detachably connected by a coupling joint, a cam on the shank of the boring bit, a projection within the upper portion of the casing with which said cam coöperates, and a spring having one end held by the shank of the boring bit and the other end operating against the upper section of the chisel casing, substantially as described.

2. A device for forming square holes comprising a rotary boring bit, a reciprocatory chisel mounted to slide lengthwise of the bit, and a cam sleeve mounted loosely on the shank of the bit, means on the shank of the bit for causing said cam sleeve to rotate therewith and permitting the boring bit to turn in a reverse direction without rotating the cam sleeve, means on the chisel coöperating with said cam sleeve and causing the chisel to be elevated during the rotation of the boring bit, and a spring for thrusting the chisel toward the work after it has been operated upon by the cam sleeve.

In testimony whereof I affix my signature in presence of two witnesses.

CHARLES A. BROWN.

Witnesses:
J. H. Wilson,
H. G. Taggard.